April 23, 1968   M. NIEDEREDER   3,379,975
SWEEP FREQUENCY LIMIT ADJUSTING CIRCUITS FOR
SWEEP GENERATOR TESTING APPARATUS
Filed Sept. 29, 1965

INVENTOR
*Martin Niedereder*
BY *Hill & Hill*
ATTYS.

[3,379,975]

Patented Apr. 23, 1968

3,379,975
SWEEP FREQUENCY LIMIT ADJUSTING CIRCUITS FOR SWEEP GENERATOR TESTING APPARATUS
Martin Niedereder, Munich-Solln, Germany, assignor to Siemens Aktiengesellschaft, a corporation of Germany
Filed Sept. 29, 1965, Ser. No. 491,245
Claims priority, application Germany, Sept. 30, 1964,
S 93,510
7 Claims. (Cl. 325—131)

ABSTRACT OF THE DISCLOSURE

A wobble transmitter with electronic frequency control having a frequency-determining circuit element controllable in its characteristic values by a period wobble voltage with predetermined time sequence and with ascending and descending flanks, the wobble transmitter comprising, means for producing a transmitting frequency, discriminator means for deriving a direct current voltage from the transmitting frequency, comparator means for producing an output pulse in response to the amplitude of the instantaneous value of the direct current voltage and a first adjustable reference voltage, and wobble voltage generator means responsive to the output pulse within the period of the wobble voltage to produce a first or a second reversal point of the wobble voltage.

---

Figure 1:
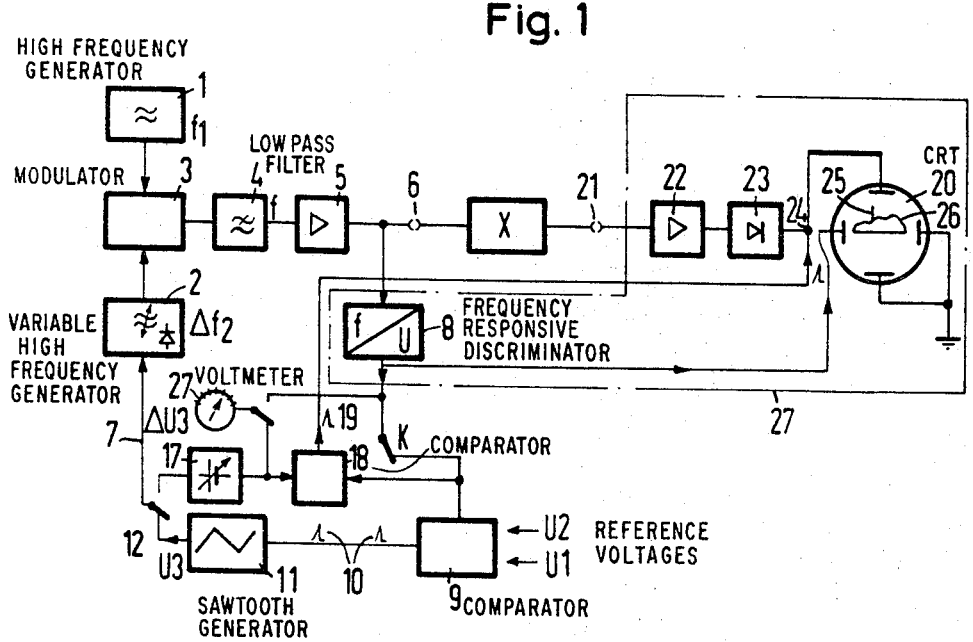

The invention relates to a wobble transmitter with electronic frequency control, in which a frequency-determining cricuit element (reactance tube, varactor or the like) is controllable in its characteristic values by means of a supplied wobble voltage, in particular a periodic one, with predetermined curve course.

In the known wobble transmitters of this type there is the disadvantage that the inconstancy of the transmitter characteristic values over a long period, which largely involves characteristic value changes of the electronic frequency control elements, makes necessary a repeated recalibration of the frequency range. Such frequency inconstancy in general leads to changes in the wobble sweep and to displacements of the wobble range, so that conventional stabilization measures in the transmitter circuit proper would involve a great circuit expenditure.

The invention solves the problem of practically excluding such inconstancy of wobble transmitters with relatively low circuit expenditure. This is achieved in a wobble transmitter of the type initially mentioned, according to the invention, by an arrangement in which a voltage derived from the transmitting frequency by means of a discriminator is rectified and compared with respect to its momentary value in a comparator connected at its input side with one or two adjustable reference voltages in such a way that in the event of equality of amplitude with either of such voltages an output pulse will be formed, and that a wobble voltage generator, known per se is externally controlled through output impulses formed in such case by the first or second reference voltage with respect to the first or second reversal point of the wobble voltage course within each period.

A considerable advantage of the wobble transmitter according to the invention lies in the feature that one or both cut-off frequencies of the wobble sweep are adjustable with great frequency constancy, although the characteristic values of the transmitter circuit proper have a considerably lower frequency constancy. Such frequency constancy is achieved according to the invention by means of an external control of the amplitude course of the wobble voltage, the circuit parts serving for the external control being, in turn, so constructed that their characteristic values have a high constancy over long periods. This last condition, which relates particularly to the frequency characteristic curve of the discriminator and the freedom from drift of the comparator, can, however, be much more easily and inexpensively realized than the conventional stabilization measures. The saving in expenditure in a use of the stabilization measures according to the invention, as compared to the conventional methods, is still greater in the case of the construction of the wobble transmitter as a beat transmitter, since in this case a frequency precision in the high frequency part of the transmitter is transferred to the lower-frequency output voltage in equal absolute magnitude, in which process the frequency precision is correspondingly increased. There, the conventional stabilization measures to be used within the transmitter circuit, that is, in the high-frequency part, would be considerably more expensive than in a direct generation of the output frequency.

Figure 2:
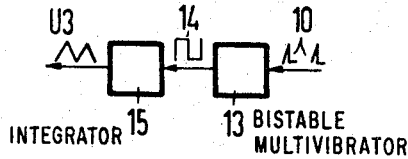

The invention will be explained with the aid of the following description of a preferred circuit example illustrated in the drawing, wherein:

FIGURE 1 is a schematic circuit diagram of a wobble transmitter embodying this invention; and FIGURE 2 is a schematic circuit of a modification of a wobble voltage generator.

FIGURE 1 illustrates a wobble transmitter constructed according to the beat principle, which consists of a high-frequency generator 1 having a constant output frequency $f_1$ and a high-frequency generator 2 having a variable output frequency $f_2$. The output voltages of both high-frequency generators are mixed in a modulator 3, in which process a low pass filter 4, connected at the output side, filters out the differential frequency $f=f_1-f_2$. The output voltage of frequency $f$ is amplified in an amplifier 5 and fed to the output 6 of the beat transmitter. The wobble range results from the fact that the high-frequency generator 2 is electronically detunable over an adjustable frequency range $\Delta f_2$. The electronic frequency control of this generator takes place by means of a wobble voltage which is fed over a control line 7 to a frequency-determining electronic circuit element (for example, reactance tube, varactor or the like).

A discriminator 8, constructed in a conventional manner, connected to the transmitter output 6, derives from the transmitting frequency $f$ a direct voltage U, the amplitude of which may be utilized as a measure of the value of the delivered transmitting frequency. The voltage U is fed, over a switch K, to a comparator 9, to whose other inputs there are fed two adjustable direct voltages U1 and U2. The comparator 9 operates in such a manner that with amplitude agreement of the voltage U with either of the voltages U1 and U2 brief output pulses 10 result, which serve for the external control of a wobble voltage generator 11, constructed in conventional manner, connected to the output side of the comparator. The wobble voltage U3 generated by the generator 11 is supplied, over a switch-over contact 12 in its lower switching position, to the control line 7. There for a certain wobble sweep $\Delta f_2$ there corresponds a voltage sweep $\Delta U3$ of the wobble voltage.

In wobble operation, i.e. with switch K closed, and with a setting of the switch-over contact 12 in its lower switching position the wobble voltage generator 11 generates first of all an increasing or decreasing flank of the wobble voltage, in which the output frequency of the electronically controlled high-frequency generator 2 is increased or decreased in correspondence to the voltage rise or drop of U3. A corresponding frequency change in the output frequency $f$ of the wobble transmitter takes place. The discriminator voltage U correspondingly changes its amplitude in which process it first lies between the values of U1 and U2, as adjusted, and approaches one of these values. If U1 or U2 is reached in amplitude by U, there then results an output pulse 10, which in each case brings about a shifting over of the wobble voltage generator 11 to the next-following wobble voltage flank. Thereby the cut-off frequencies of the wobble sweep are established by the size of the reference voltages U1 and U2 that are determined, with the instantaneous value of the discriminator output voltage U always varying between these two values. Upon agreement of U with one of these values U1, U2 there takes place in each instance a reversal of the direction of the frequency change, so that the instantaneous value of U again approaches the other value.

If the U/f characteristic curve of the discriminator 8 is now formed in such a way that it exactly corresponds to a desired course, for example a linear or logarithmic course, and has a great constancy over a long period, the output voltage U can then be used with the reference voltages U1 and U2, which are adjustable with great precision and constancy, for a precisely defined external control of generator 11. Further, if the adjustable reference voltages U1 and U2 are calibrated, corresponding to the characteristic curve of the discriminator 8, in values of the transmitting frequency $f$, then the exact frequency also can be set at which each individual directional reversal of the frequency change is to take place. This means, that through both reference voltages U1 and U2, the cut-off frequencies of the wobble stroke may be set with exactness and constancy in time.

With somewhat lesser requirements of accuracy on the wobble transmitter it is also possible to dispense with one of the reference voltages U1 and U2, in which case, however, the wobble voltage generator 11 would be so constructed that the reversal pulses now dropping out (each second reversal pulse 10 drops out) would be replaced by corresponding automatic controls. In the latter case always only the increasing or decreasing flank of each wobble voltage period is released by a pulse 10, while the other flank is released automatically by a time or voltage limit means associated with the wobble voltage generator.

An advantageous construction of the wobble voltage generator, where two reference voltages U1 and U2 are provided, is illustrated in detail in FIGURE 2. As is apparent therefrom, the output pulses 10, in each case, shift over a bistable multivibrator 13, so that a rectangular voltage 14 results, which is supplied as a control voltage to the input of an integrator 15, known per se (for example a Miller integrator). The integrator delivers a triangular voltage 16, whose flank steepnesses can be altered in a manner known per se, for example, by adjustment of its integration time constant. Instead of such a wobble voltage with a linear flank course there can also be generated a modified course, as desired, as, for example, an exponential course.

In FIGURE 1 there is further provided, an adjustable direct current source 17, which is likewise calibrated in values of the transmitting frequency $f$, in correspondence to the U/f characteristic curve of the discriminator 8. This adjustable direct current is supplied, together with the discriminator voltage U, to a comparator 18 which on amplitude equality generates a marker pulse 19 which can be used to special advantage in an allocated registering or viewing device for the formation of a frequency marker, which is likewise adjustable with great precision and constancy.

In FIGURE 1 there is represented a viewing device 27 which contains a cathode ray tube 20, the input of the viewing device being designated as 21, in which system a four-pole X representing the object to be measured, whose frequency characteristic 26 can be pictorially represented with the aid of the combination consisting of the wobble transmitter and the viewing device, is connected between the oscillator output 6 and the input 21. The voltage to be measured, lying on the terminal 21, is amplified in an amplifier 22 and, after rectification in a rectifier 23, is supplied to the vertical deflection circuit of the cathode ray tube 20, while the horizontal deflection is controlled, for example, by the output voltage of a discriminator lying on the measuring frequency. Such discriminator, allocated to the viewing device, where the transmitter and viewing device are combined at the same location, can be identical with the discriminator 8 belonging to the wobble transmitter, illustrated in FIGURE 1. The marker pulses 19, for the formation of a frequency marker on the screen of the cathode ray tube 20, are supplied to the vertical deflecting device at 24. As a result there arises an additional vertical deflection 25 of the electron beam at the point of the frequency characteristic 26 to be analyzed. Obviously, it is possible to also effect the frequency marking by means of the pulses 19 in another manner, as, for example, by a brightness control, known per se, in which the pulses 19 are fed to a brightness control electrode of the cathode ray tube 20.

On opening of switch K and switching over of contact 12 into the upper switching position the wobble operation is interrupted, in which process simultaneously a transmitter tuning can take place manually by the setting of the now-connected direct current source 17. Here, too, the magnitude of the set direct voltage is read on a scale which is calibrated in correspondence to the discriminator characteristic curve U/f in values of the transmitting frequency $f$. Expediently there is provided a voltmeter 27, provided with a frequency scale, which is connectible at will to the output of the discriminator 8 or to the output of the adjustable direct current source 17. The connection to the discriminator output is here accomplished for the purpose of providing a precise reading of the oscillation frequency $f$ settable at the direct current source 17 in manual operation, while the connection to the direct current source 17 in wobble operation enables a checking of the frequency setting of the marker pulse 19 or of the frequency marker 25 appearing on the viewing device.

In the event the wobble oscillator according to the invention is not constructed according to the beat principle, but generates the output frequency directly, the circuit example of FIGURE 1 can likewise be utilized for a detailed explanation. In this case the output of the high frequency generator 2 would have to be connected directly with the input of amplifier 5, while the circuit parts 1, 3 and 4 would be omitted.

Changes may be made within the scope and spirit of the appended claims which define what is believed to be new and desired to have protected by Letters Patent.

I claim:

1. A wobble transmitter with electronic frequency control, having a frequency-determining circuit element controllable in its characteristic value by means of a periodic wobble voltage with predetermined time sequence and with alternating ascending and descending flanks, said wobble transmitter comprising means for producing a transmitting frequency, frequency discriminator means connected to the output terminals of said means for producing a transmitting frequency for deriving a DC voltage from said transmitting frequency, the amplitude value of said DC voltage being solely dependent on the value of said transmitting frequency, comparator means connected to said frequency discriminator means and to a first and second adjustable reference voltage for producing an output pulse in response to the equality of amplitude of the instantaneous value of said DC voltage and the value of each one of said reference voltages, wobble voltage generator means connected to said comparator means responsive to said output pulses to produce a change-over from one of said alternating flanks to the following one, said wobble voltage generator means being connected to said frequency-determining circuit element for applying said wobble voltage as a control voltage for controlling said characteristic value, and said circuit element being connected to said means for producing a transmitting frequency.

2. A wobble transmitter according to claim 1, wherein said wobble voltage generator means includes a bistable multivibrator controlled by said output pulses for producing a rectangular voltage, and an integrator responsive to said rectangular voltage for generating said wobble voltage.

3. A wobble transmitter according to claim 1, comprising in further combination, means for producing an adjustable DC voltage calibrated in values of the transmitting frequency, in correspondence to the characteristic curve of said discriminator means, a second comparator means responsive to an amplitude equality of said adjustable DC voltage and said DC voltage for generating a marking pulse, and an allocated evaluating device responsive to said marking pulse for producing a frequency marker.

4. A wobble transmitter according to claim 3, comprising a change-over switch for alternatively connecting said adjustable DC voltage and said wobble voltage with said circuit element.

5. A wobble transmitter according to claim 3, comprising in further combination, a voltmeter calibrated in values of the transmitting frequency in correspondence with the frequency discriminator characteristic curve for alternatively measuring said DC voltage derived from said transmitting frequency and said adjustable DC voltage.

6. A wobble transmitter according to claim 1, comprising in further combination, a second transmitter for producing a constant output frequency and modulator means for mixing said constant output frequency with said transmitting frequency.

7. A wobble transmitter according to claim 3, wherein said evaluating device comprises writing means which are deflected dependent on time, said writing means being controlled by said DC voltage derived from said transmitting frequency.

References Cited

UNITED STATES PATENTS

| | | | |
|---|---|---|---|
| 2,681,414 | 6/1954 | Strandberg | 331—4 |
| 2,738,417 | 3/1956 | Hunt et al. | 325—65 |
| 2,920,269 | 1/1960 | Hanysz et al. | 331—178 X |
| 3,135,929 | 6/1964 | Kornbluth et al. | 331—178 |

OTHER REFERENCES

Hewlett-Packard Journal, vol. 15, No. 4, December 1963 (8 pages), copy in 331—178.

ROBERT L. GRIFFIN, *Primary Examiner.*

JOHN W. CALDWELL, *Examiner.*

B. V. SAFOUREK, *Assistant Examiner.*